(12) United States Patent
Tagi et al.

(10) Patent No.: US 9,960,485 B2
(45) Date of Patent: May 1, 2018

(54) ANTENNA DEVICE USING EBG STRUCTURE, WIRELESS COMMUNICATION DEVICE, AND RADAR DEVICE

(71) Applicant: Panasonic Intellectual Property Management Co., Ltd., Osaka (JP)

(72) Inventors: Hiroyoshi Tagi, Osaka (JP); Hideki Iwaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 314 days.

(21) Appl. No.: 14/884,765

(22) Filed: Oct. 16, 2015

(65) Prior Publication Data

US 2016/0141749 A1 May 19, 2016

(30) Foreign Application Priority Data

Nov. 19, 2014 (JP) ................. 2014-234820

(51) Int. Cl.
| | | |
|---|---|---|
| *H01Q 1/42* | (2006.01) | |
| *H01Q 1/38* | (2006.01) | |
| *G01S 7/03* | (2006.01) | |
| *H01Q 1/40* | (2006.01) | |
| *H01Q 1/52* | (2006.01) | |
| *H01Q 15/00* | (2006.01) | |

(52) U.S. Cl.
CPC ............... *H01Q 1/38* (2013.01); *G01S 7/032* (2013.01); *H01Q 1/405* (2013.01); *H01Q 1/521* (2013.01); *H01Q 15/006* (2013.01)

(58) Field of Classification Search
CPC  H01Q 1/42; H01Q 1/52; H01Q 1/243; H01Q 1/38; H01Q 9/0421
USPC .................. 343/872, 846, 893, 841, 700 MS
See application file for complete search history.

(56) References Cited

U.S. PATENT DOCUMENTS

| | | | | |
|---|---|---|---|---|
| 2009/0153433 A1* | 6/2009 | Nagai | ...................... | H01Q 1/38 343/893 |
| 2010/0039343 A1* | 2/2010 | Uno | ......................... | H01Q 3/24 343/818 |
| 2011/0212697 A1 | 9/2011 | Aoki et al. | | |

FOREIGN PATENT DOCUMENTS

| | | |
|---|---|---|
| JP | 2006-060537 | 3/2006 |
| JP | 2009-203147 | 9/2009 |
| JP | 2011-055306 | 3/2011 |

* cited by examiner

*Primary Examiner* — Dameon E Levi
*Assistant Examiner* — Collin Dawkins
(74) *Attorney, Agent, or Firm* — McDermott Will & Emery LLP

(57) ABSTRACT

An antenna device comprises a first dielectric substrate; first and second antenna elements arranged on a first surface of the first dielectric substrate; a ground conductor arranged on a second surface of the first dielectric substrate; and an EBG structure arranged between the first and second antenna elements. The EBG structure comprises first patch conductors that are each arranged in contact with the first surface of the first dielectric substrate and are each electromagnetically coupled with the ground conductor; second patch conductors that are each arranged in a prescribed distance from the first surface of the first dielectric substrate in a direction opposite to the second surface, and are each electromagnetically coupled with corresponding one of the first patch conductors; and first connection conductors that electrically connect the first patch conductors with the second patch conductors.

9 Claims, 12 Drawing Sheets

FIG. 9
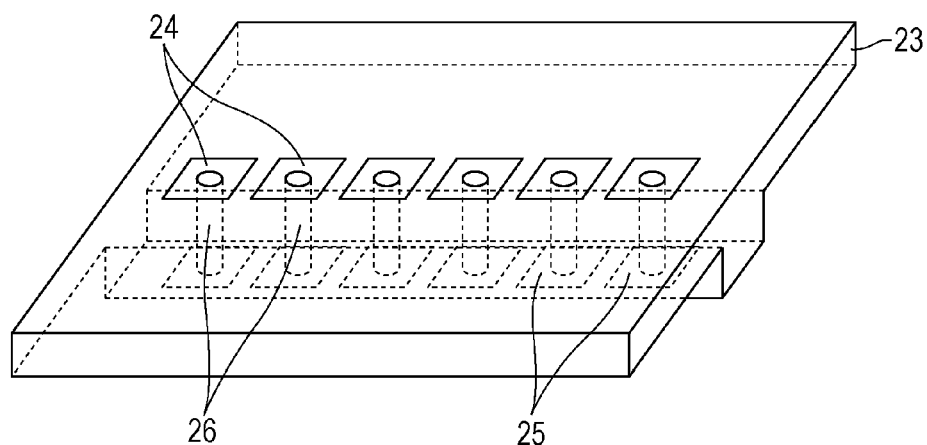
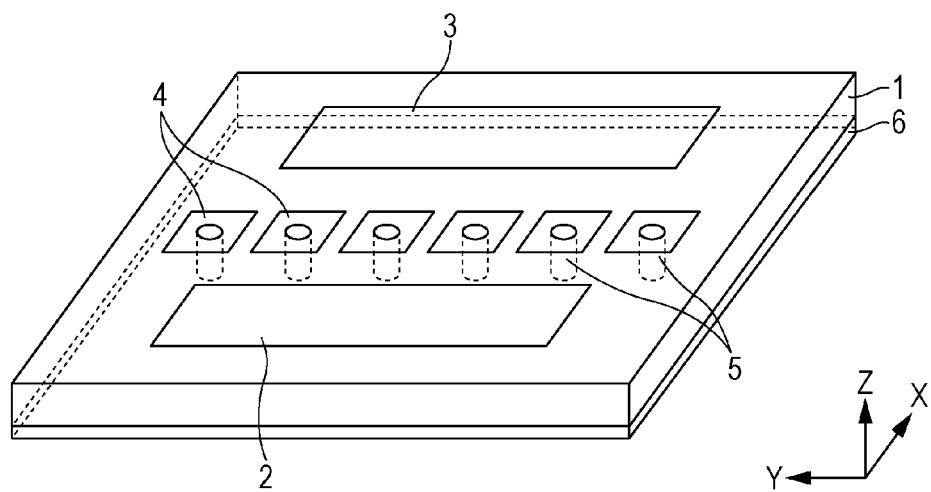

ANTENNA DEVICE USING EBG STRUCTURE, WIRELESS COMMUNICATION DEVICE, AND RADAR DEVICE

BACKGROUND

1. Technical Field

The present disclosure relates to an antenna device provided with a plurality of antenna elements and an electromagnetic band gap (EBG) structure. The present disclosure also relates to a wireless communication device and a radar device provided with such an antenna device.

2. Description of the Related Art

The use of an EBG structure to ensure isolation between antenna elements in an antenna device that comprises a plurality of antenna elements and operates in an extremely high frequency (EHF) band is conventionally known (see Japanese Unexamined Patent Application Publication Nos. 2009-203147 and 2006-060537). An EBG structure exhibits high impedance at a prescribed frequency (antiresonance frequency). Consequently, an antenna device provided with an EBG structure is able to increase the isolation between antenna elements in this frequency.

SUMMARY

An aspect of the present disclosure provides an antenna device that is able to improve the effect of increasing the isolation between antenna elements.

In one general aspect, the techniques disclosed here feature an antenna device comprising: a first dielectric substrate that has first and second surfaces; first and second antenna elements that are arranged on the first surface of the first dielectric substrate; a ground conductor that is arranged on the second surface of the first dielectric substrate; and an electromagnetic band gap (EBG) structure that is arranged between the first and second antenna elements. The EBG structure comprises: a plurality of first patch conductors that are each arranged in contact with the first surface of the first dielectric substrate and are each electromagnetically coupled with the ground conductor; a plurality of second patch conductors that are each arranged in a prescribed distance from the first surface of the first dielectric substrate in a direction opposite to the second surface of the first dielectric substrate, and are each electromagnetically coupled with corresponding one of the plurality of first patch conductors; and a plurality of first connection conductors that electrically connect the plurality of first patch conductors with the plurality of second patch conductors to each other.

According to an aspect of the present disclosure, it is possible to improve the effect of increasing the isolation between antenna elements. It should be noted that general or specific aspects of the present disclosure may be implemented as an antenna device, a wireless communication device, a radar device, an apparatus, a system or any combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is an exploded perspective view illustrating the configuration of the antenna device of FIG. 7;

DETAILED DESCRIPTION

Findings Forming the Basis for the Present Disclosure

In order to improve the effect of increasing the isolation between antenna elements with an EBG structure, it is necessary to increase the size of the EBG structure. However, it is not possible to arrange other components and wiring in portions in which the EBG structure is arranged in an antenna device, and therefore the dimensions of the antenna device increase and cost also consequently increases. Thus, providing a large EBG structure in an antenna device results in design limitations.

Therefore, the present inventors carried out assiduous research in order to provide an antenna device comprising an EBG structure, with which it is possible to improve the effect of increasing the isolation between antenna elements while minimizing an increase in the size of the antenna device and design limitations. The present inventors additionally carried out assiduous research in order to provide a wireless communication device and a radar device comprising such an antenna device.

Hereinafter, an antenna device according to an embodiment will be described with reference to the drawings. In the following description, same symbols are appended to same or similar constituent elements.

First Embodiment

Figure 1:
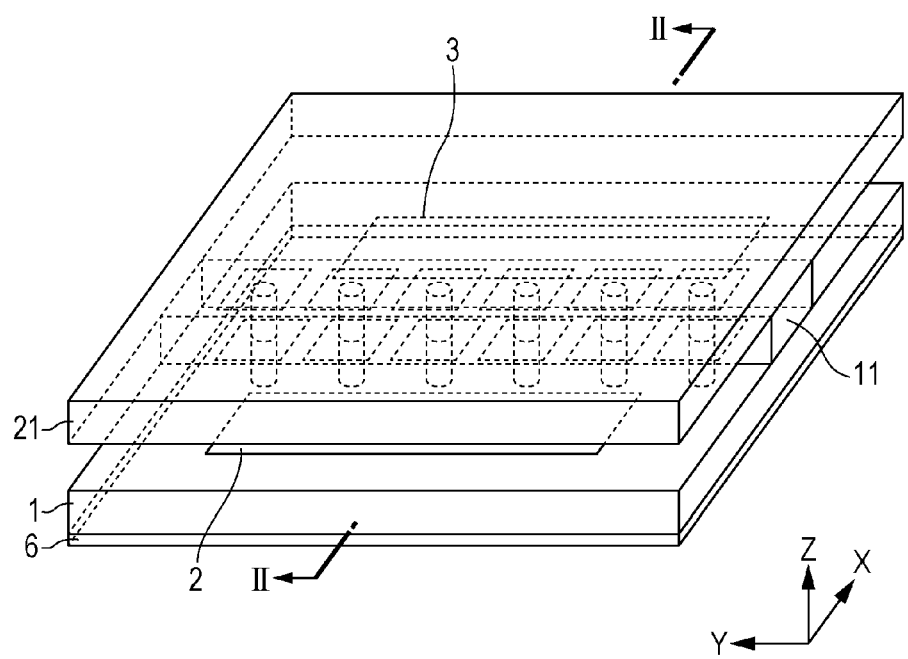
FIG. 1 is a perspective view illustrating the configuration of an antenna device according to a first embodiment.
Figure 2:
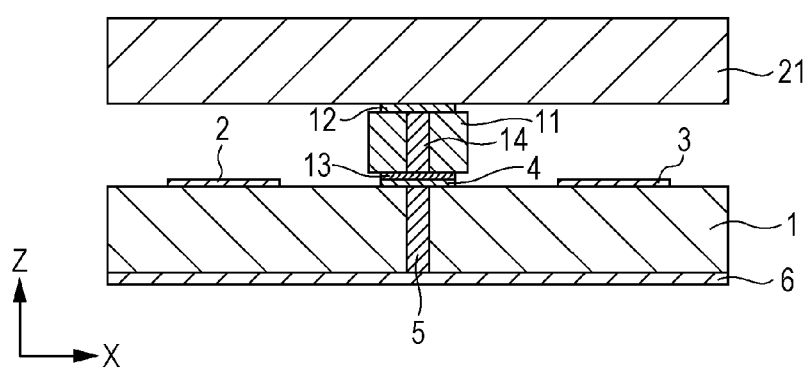
FIG. 2 is a cross-sectional view illustrating the configuration of the antenna device at line II-II of FIG. 1.

FIG. 1 is a perspective view illustrating the configuration of an antenna device according to a first embodiment. FIG.

Figure 3:
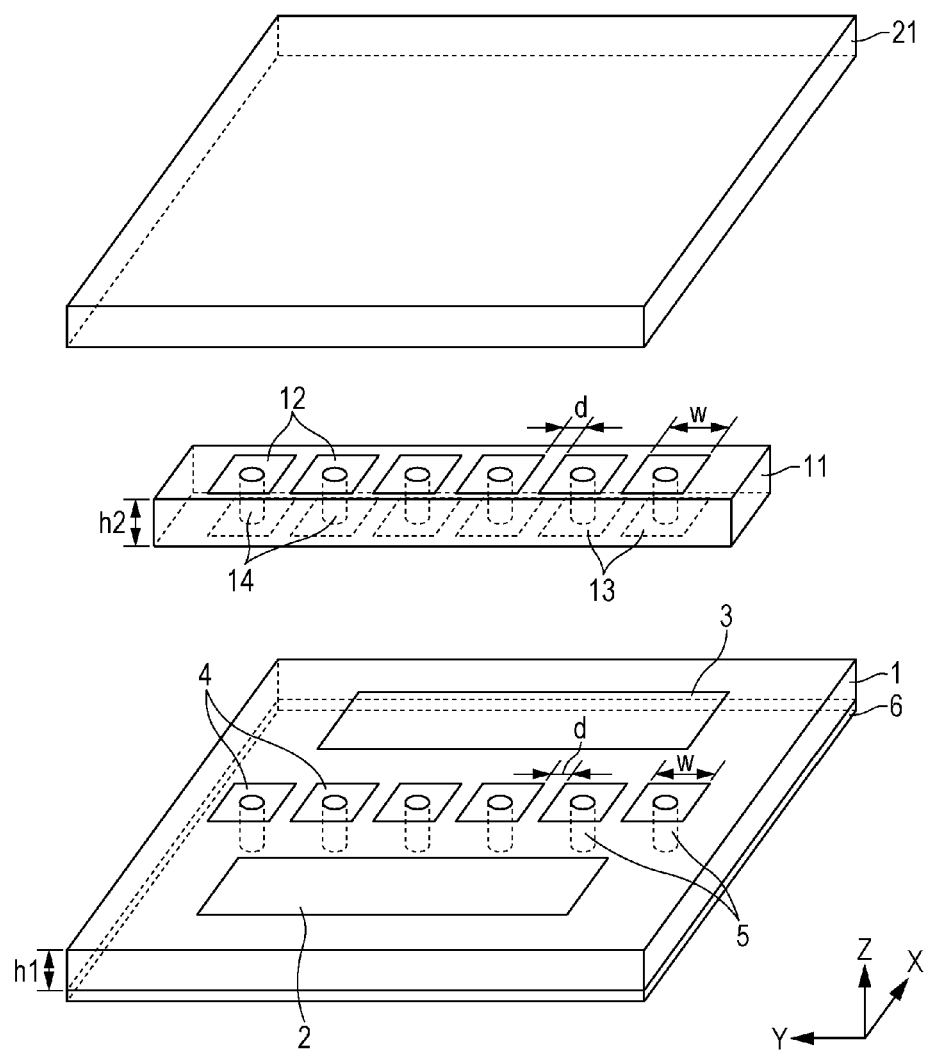
FIG. 3 is an exploded perspective view illustrating the configuration of the antenna device of FIG. 1.

2 is a cross-sectional view illustrating the configuration of the antenna device at line II-II of FIG. 1. FIG. 3 is an exploded perspective view illustrating the configuration of the antenna device of FIG. 1.

The antenna device of FIG. 1 comprises: a dielectric substrate 1 (first dielectric substrate) that has a first surface (upper surface in FIG. 1) and a second surface (lower surface in FIG. 1); antenna elements 2 and 3 that are formed on the first surface of the dielectric substrate 1; a ground conductor 6 that is formed on the second surface of the dielectric substrate 1; and an electromagnetic band gap (EBG) structure that is formed between the antenna elements 2 and 3. The EBG structure comprises: a plurality of patch conductors 4 and 13 (first patch conductors); a plurality of patch conductors 12 (second patch conductors) that are each formed in a prescribed distance from the first surface of the dielectric substrate 1 in a direction (+Z direction) opposite to the second surface of the dielectric substrate 1, and are each electromagnetically coupled with the plurality of patch conductors 4 and 13; and a plurality of via conductors 14 (first connection conductors) that electrically connect the plurality of patch conductors 4 and 13 with the plurality of patch conductors 12. Each pair of patch conductors 4 and 13 is located in contact with the first surface of the dielectric substrate 1 and is electromagnetically coupled with the ground conductor 6

The EBG structure further comprises a dielectric substrate 11 (second dielectric substrate) that has a first surface (upper surface in FIG. 1) and a second surface (lower surface in FIG. 1), and at least part of the second surface of the dielectric substrate 11 includes a contact region that makes contact with the first surface of the dielectric substrate 1 by way of the plurality of patch conductors 4 and 13. The plurality of patch conductors 12 are formed on the first surface of the dielectric substrate 11. The plurality of patch conductors 13 are formed in the contact region of the second surface of the dielectric substrate 11. The via conductors 14 each pass through the dielectric substrate 11.

The antenna device further comprises a plurality of via conductors 5 (second connection conductance) that each pass through the dielectric substrate 1 and electrically connect the plurality of patch conductors 4 and 13 with the ground conductor 6.

The patch conductors 4 are formed on the first surface of the dielectric substrate 1, and the patch conductors 13 are formed on the second surface of the dielectric substrate 11. The patch conductors 4 and 13 are formed so as to be electrically connected to each other when the contact region of the second surface of the dielectric substrate 11 makes contact with the first surface of the dielectric substrate 1. The patch conductors 13 may be omitted if the patch conductors 4 and the via conductors 14 are electrically connected. The patch conductors 4 may be omitted if the patch conductors 13 and the via conductors 5 are electrically connected.

The patch conductors 4, 12, and 13 are, for example, periodically formed in a column that extends so as to intersect a hypothetical line that joins the antenna elements 2 and 3. In the example of FIG. 1, the plurality of patch conductors 4, 12, and 13 are arranged along the Y axis.

In the example of FIG. 1, each of the patch conductors 4, 12, and 13 has a square shape. However, each of the patch conductors 4, 12, and 13 is not restricted to a square and may have any shape such as a triangle, a hexagon, a rectangle, or the like.

The antenna device of FIG. 1 operates in an EHF band, for example. However, the antenna device of FIG. 1 is not restricted to an EHF band and may operate in any frequency in which it is possible to use an antiresonance frequency of the EBG structure.

The distance between the patch conductors 4 and 13 and the patch conductors 12 (or the distance from the first surface of the dielectric substrate 1 to the second surface of a radome 21) is, for example, set to one wavelength or more in the operation frequency of the antenna device.

The radome 21 may be omitted in the antenna device of FIG. 1.

The dielectric substrate 1, the dielectric substrate 11, and the radome 21 may be fixed to each other with one or more screws or the like.

The antenna device may further comprise the radome 21, which has a first surface (upper surface in FIG. 1) and a second surface (lower surface in FIG. 1). In this case, the second surface of the radome 21 is provided so as to make contact with the first surface of the dielectric substrate 11.

The EBG structure comprises a two-stage mushroom-type conductor that includes the patch conductors 12, the via conductors 14, the patch conductors 4 and 13, and the via conductors 5. In particular, the EBG structure includes portions (the patch conductors 12 and the via conductors 14) that protrude in the +Z direction from the surface (the first surface of the dielectric substrate 1) that includes the antenna elements 2 and 3, and is thereby able to reduce spatial coupling between the antenna elements 2 and 3 to a greater extent than an EBG structure that includes only the patch conductors 4 and the via conductors 5 (i.e. one-stage mushroom-type conductor).

It is feasible for the EBG structure to be formed of multiple stages in order to change the antiresonance frequency of the EBG structure. A multistage EBG structure comprises a plurality of substrates, and a plurality of via conductors are arranged in such a way as to pass through these substrates, for example. In each substrate, it is not possible to provide other components and wiring in portions in which the via conductors are provided, and therefore the dimensions of the antenna device increase and cost also consequently increases. Thus, using a multistage EBG structure results in design limitations.

However, according to the antenna device of FIG. 1, the EBG structure does not include constituent elements positioned at the −Z side of the ground conductor 6, and includes portions that protrude in the +Z direction from the surface that includes the antenna elements 2 and 3. Consequently, the EBG structure is able to not only control surface waves that propagate on the dielectric substrate 1 but also reduce spatial coupling between the antenna elements 2 and 3.

The necessity of ensuring high isolation between antenna elements increases in the EHF band. According to the antenna device of FIG. 1, it is possible to ensure high isolation between the antenna elements 2 and 3 in the desired frequency band.

According to the antenna device of FIG. 1, which comprises an EBG structure, it is possible to improve the effect of increasing the isolation between the antenna elements 2 and 3 while minimizing an increase in the size of the antenna device and design limitations.

Second Embodiment

Figure 4:
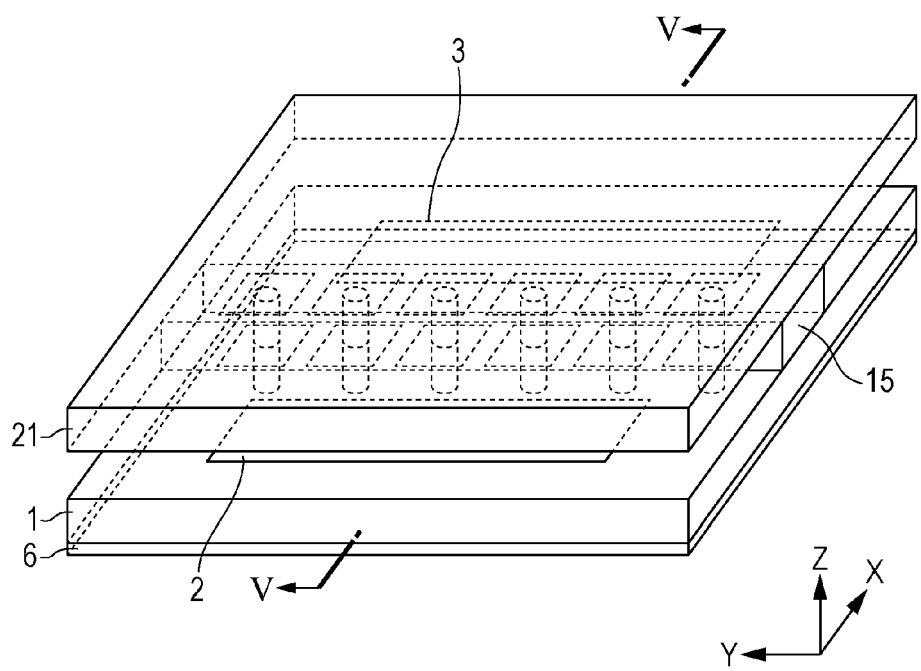
FIG. 4 is a perspective view illustrating the configuration of an antenna device according to a second embodiment.
Figure 5:
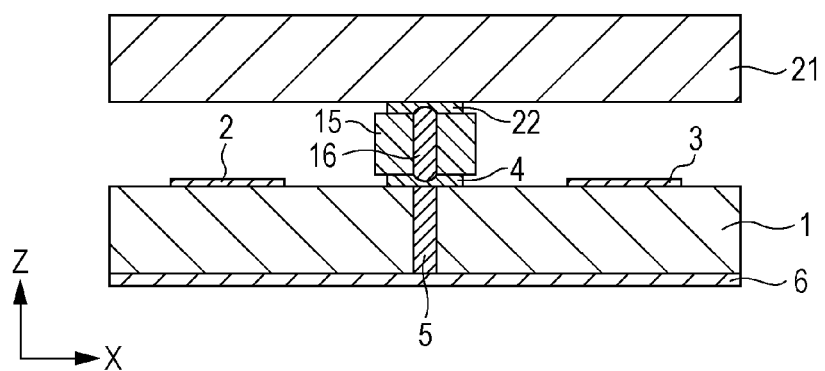
FIG. 5 is a cross-sectional view illustrating the configuration of the antenna device at line V-V of FIG. 4.
Figure 6:
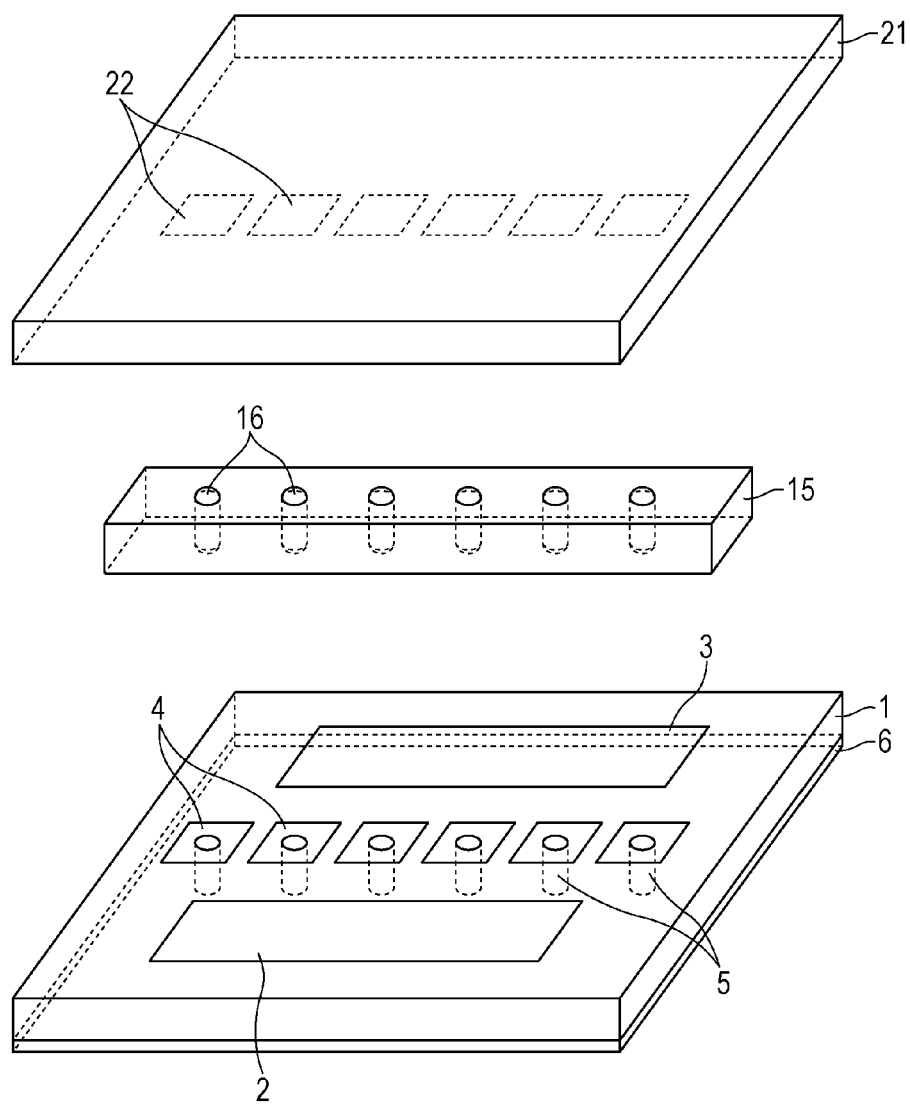
FIG. 6 is an exploded perspective view illustrating the configuration of the antenna device of FIG. 4.

FIG. 4 is a perspective view illustrating the configuration of an antenna device according to a second embodiment. FIG. 5 is a cross-sectional view illustrating the configuration of the antenna device at line V-V of FIG. 4. FIG. 6 is an exploded perspective view illustrating the configuration of the antenna device of FIG. 4.

In the antenna device of FIG. 4, the EBG structure comprises: the plurality of patch conductors 4 (first patch conductors) that are each formed in contact with the first surface (upper surface in FIG. 4) of the dielectric substrate 1 and are each electromagnetically coupled with the ground conductor 6; a plurality of patch conductors 22 (second patch conductors) that are each formed a prescribed distance from the first surface of the dielectric substrate 1 in the direction (+Z direction) opposite to the second surface (lower surface in FIG. 4) of the dielectric substrate 1, and are each electromagnetically coupled with the plurality of patch conductors 4; and a plurality of connection conductors 16 (first connection conductors) that electrically connect the plurality of patch conductors 4 with the plurality of patch conductors 22.

The antenna device further comprises the radome 21 that has the first surface (upper surface in FIG. 4) and the second surface (lower surface in FIG. 4). The radome 21 is arranged in a prescribed distance from the first surface of the dielectric substrate 1 in the direction opposite to the second surface. The second surface of the radome opposes the first surface of the dielectric substrate 1 at a distance that is approximately the same as the distance between the patch conductors 4 and 22. The plurality of patch conductors 4 are formed on the first surface of the dielectric substrate 1. The plurality of patch conductors 22 are formed on the second surface of the radome 21. The EBG structure further comprises a connector component 15 that comprises a plurality of sockets that accommodate each of the plurality of connection conductors 16 (first connection conductors).

Both ends of each connection conductor 16 are formed in a pointed shape, for example, and are provided so as to protrude from the sockets of the connector component 15. Thus, when the dielectric substrate 1, the connector component 15, and the radome 21 are stacked and fixed to each other, the patch conductors 4 and 22 are electrically connected to each other via the connection conductors 16.

The dielectric substrate 1, the connector component 15, and the radome 21 may be fixed to each other with one or more screws or the like.

As with the antenna device of FIG. 1, according to the antenna device of FIG. 4, which comprises an EBG structure, it is possible to improve the effect of increasing the isolation between the antenna elements 2 and 3 while minimizing an increase in the size of the antenna device and design limitations.

Third Embodiment

Figure 7:
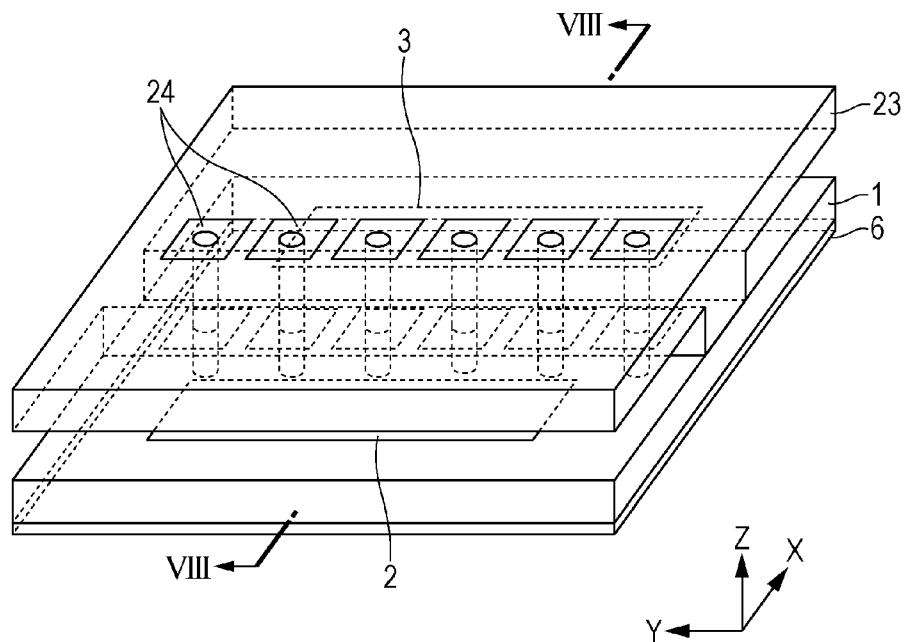
FIG. 7 is a perspective view illustrating the configuration of an antenna device according to a third embodiment.
Figure 8:
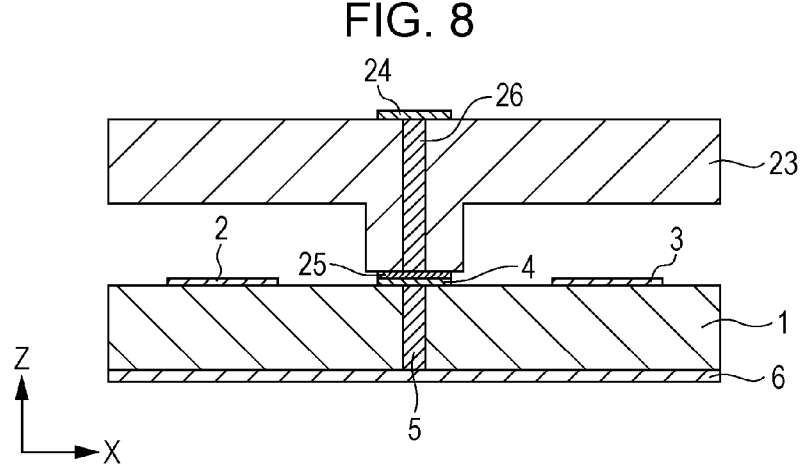
FIG. 8 is a cross-sectional view illustrating the configuration of the antenna device at line VIII-VIII of FIG. 7.

FIG. 7 is a perspective view illustrating the configuration of an antenna device according to a third embodiment. FIG. 8 is a cross-sectional view illustrating the configuration of the antenna device at line VIII-VIII of FIG. 7. FIG. 9 is an exploded perspective view illustrating the configuration of the antenna device of FIG. 7.

According to the antenna device of FIG. 7, the EBG structure comprises: a plurality of patch conductors 4 and 25 (first patch conductors); a plurality of patch conductors 24 (second patch conductors) that are each formed a prescribed distance from the first surface of the dielectric substrate 1 in the direction (+Z direction) opposite to the second surface (lower surface in FIG. 7) of the dielectric substrate 1, and are each electromagnetically coupled with corresponding pair of first patch conductors 4 and 25 from among the plurality of patch conductors 4 and 25; and a plurality of via conductors 26 (first connection conductors) that electrically connect the plurality of patch conductors 4 and 25 with the plurality of patch conductors 24. Each pair of patch conductors 4 and 25 is located in contact with the first surface (upper surface in FIG. 7) of the dielectric substrate 1 and is electromagnetically coupled with the ground conductor 6.

The EBG structure further comprises a radome 23 (second dielectric substrate) that has a first surface (upper surface in FIG. 7) and a second surface (lower surface in FIG. 7), and at least part of the second surface of the radome 23 includes a contact region that makes contact with the first surface of the dielectric substrate 1 by way of the plurality of patch conductors 4 and 25. The plurality of patch conductors 24 are formed on the first surface of the radome 23. The plurality of patch conductors 25 are formed in the contact region of the second surface of the radome 23. The via conductors 26 each pass through the radome 23.

The patch conductors 4 are formed on the first surface of the dielectric substrate 1, and the patch conductors 25 are formed on the second surface of the radome 23. The patch conductors 4 and 25 are formed so as to be electrically connected to each other when the contact region of the second surface of the radome 23 makes contact with the first surface of the dielectric substrate 1. The patch conductors 25 may be omitted if the patch conductors 4 and the via conductors 14 are electrically connected. The patch conductors 4 may be omitted if the patch conductors 25 and the via conductors 5 are electrically connected.

The dielectric substrate 1 and the radome 23 may be fixed to each other with one or more screws or the like.

According to the antenna device of FIG. 7, the construction of the antenna device is able to be simplified by providing the radome 23, in which the dielectric substrate 11 and the radome 21 of the antenna device of FIG. 1 are integrated.

As with the antenna device of FIG. 1, according to the antenna device of FIG. 7, which comprises an EBG structure, it is possible to improve the effect of increasing the isolation between the antenna elements 2 and 3 while minimizing an increase in the size of the antenna device and design limitations.

Fourth Embodiment

Figure 10:
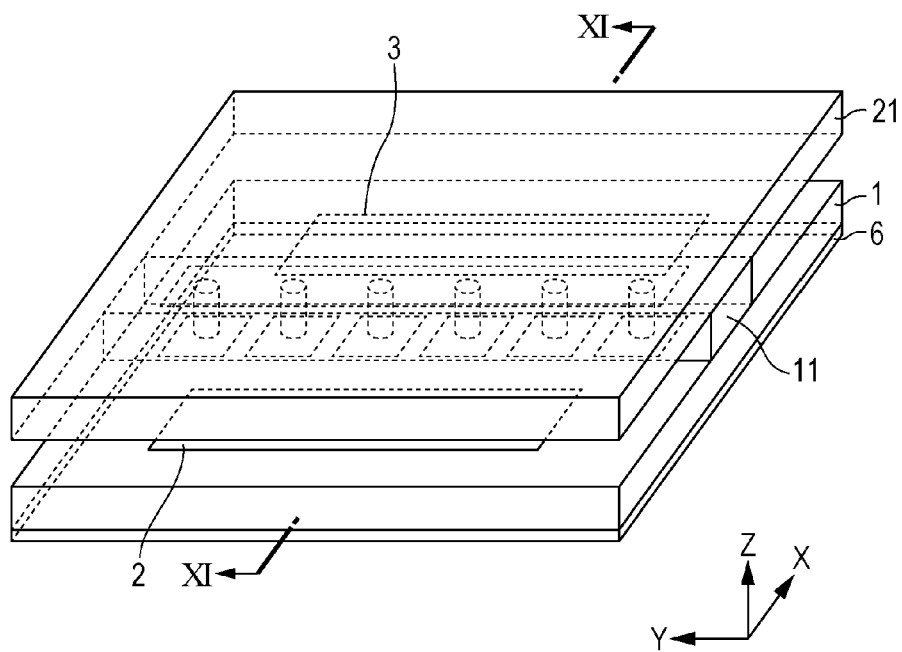
FIG. 10 is a perspective view illustrating the configuration of an antenna device according to a fourth embodiment.
Figure 11:
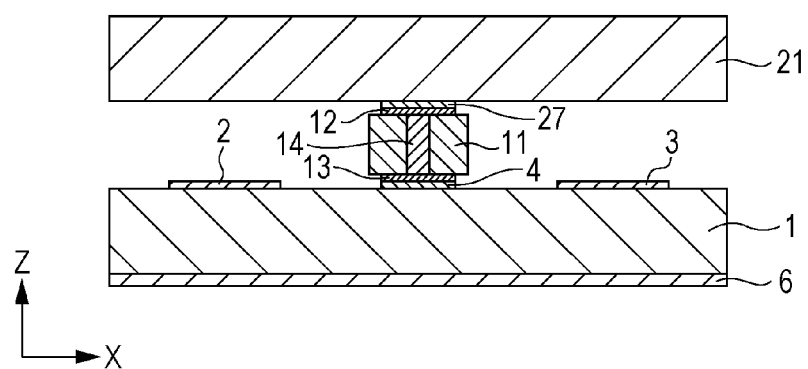
FIG. 11 is a cross-sectional view illustrating the configuration of the antenna device at line XI-XI of FIG. 10.
Figure 12:
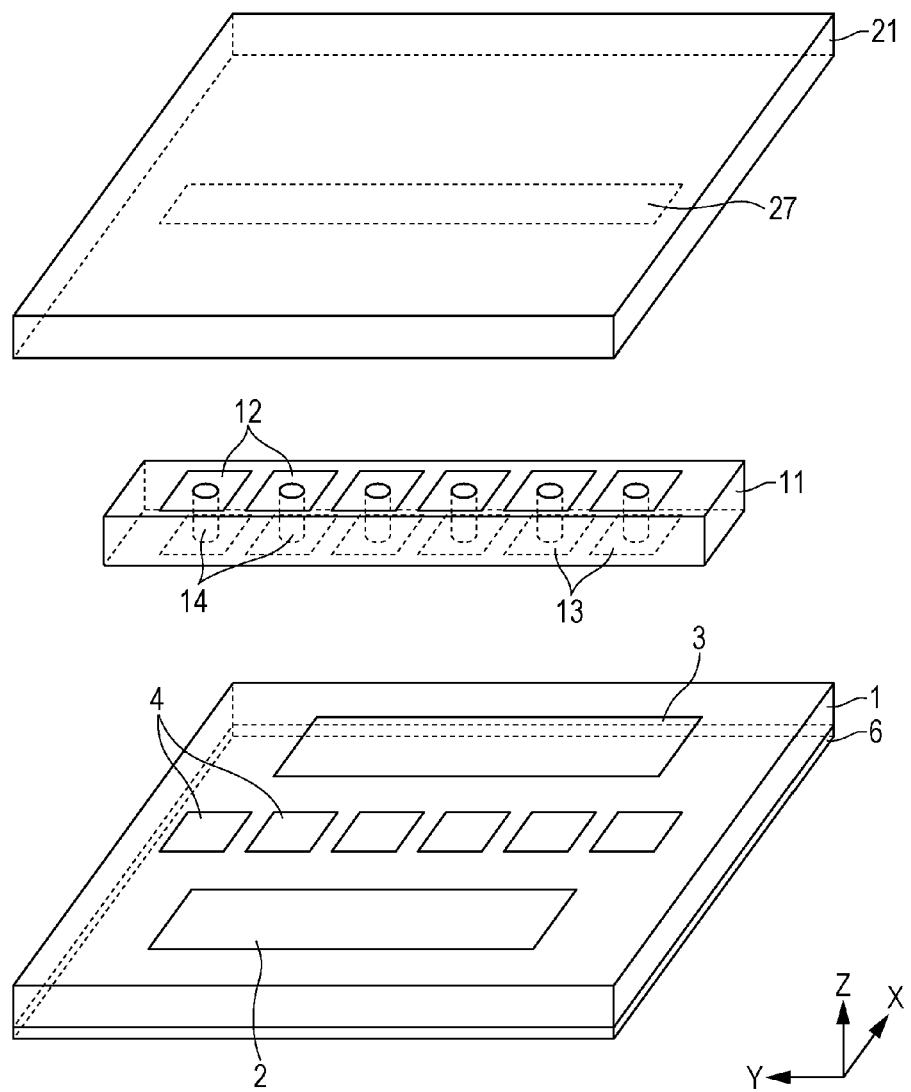
FIG. 12 is an exploded perspective view illustrating the configuration of the antenna device of FIG. 10.

FIG. 10 is a perspective view illustrating the configuration of an antenna device according to a fourth embodiment. FIG. 11 is a cross-sectional view illustrating the configuration of the antenna device at line XI-XI of FIG. 10. FIG. 12 is an exploded perspective view illustrating the configuration of the antenna device of FIG. 10.

The via conductors 5 (second connection conductors) of FIG. 1 may be omitted. In the antenna device of FIG. 10, the radome 21 comprises a strip conductor 27 that is formed on the second surface (lower surface in FIG. 10). The plurality of patch conductors 12 formed on the first surface (upper surface in FIG. 10) of the dielectric substrate 11 are electrically connected to each other by way of the strip conductor 27 when the dielectric substrates 1 and 11 and the radome 21 are stacked and fixed to each other.

In the antenna device of FIG. 10, the EBG structure comprises a one-stage mushroom-type conductor that includes the patch conductors 12, the strip conductor 27, the via conductors 14, and the patch conductors 4 and 13. The EBG structure of FIG. 10 includes portions (the patch conductors 12, the strip conductor 27, and the via conductors 14) that protrude in the +Z direction from the surface (the first surface of the dielectric substrate 1) that includes the antenna elements 2 and 3, and is thereby able to reduce spatial coupling between the antenna elements 2 and 3 to a greater extent than an EBG structure that includes only the patch conductors 4 and the via conductors 5 (i.e. one-stage mushroom-type conductor).

The patch conductors 4 and 13 are formed so as to be electrically connected to each other when the contact region of the second surface of the dielectric substrate 11 makes contact with the first surface of the dielectric substrate 1. The patch conductors 13 may be omitted if the patch conductors 4 and the via conductors 14 are electrically connected.

A strip conductor that electrically connects the plurality of via conductors 14 to each other may be formed instead of the plurality of patch conductors 12 formed on the first surface of the dielectric substrate 11. In this case, the strip conductor 27 formed on the second surface of the radome 21 may be omitted.

The plurality of patch conductors 4 formed on the first surface (upper surface in FIG. 10) of the dielectric substrate 1 may be omitted.

As with the antenna device of FIG. 10, the via conductors 5 may also be omitted in the antenna device of FIG. 4.

As with the antenna device of FIG. 10, the via conductors 5 may also be omitted in the antenna device of FIG. 7. In this case, a strip conductor that electrically connects the plurality of via conductors 26 to each other may be formed instead of the plurality of patch conductors 24 formed on the first surface (upper surface in FIG. 7) of the radome 23 of FIG. 7.

As with the antenna devices of FIGS. 1, 4, and 7, according to the antenna device of FIG. 10, which comprises an EBG structure, it is possible to improve the effect of increasing the isolation between the antenna elements 2 and 3 while minimizing an increase in the size of the antenna device and design limitations.

Fifth Embodiment

Figure 13:
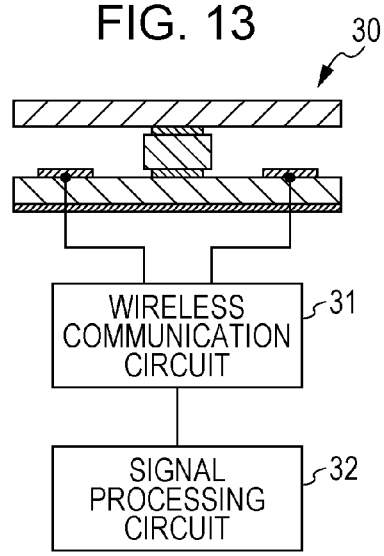
FIG. 13 is a block diagram illustrating the configuration of a wireless communication device according to a fifth embodiment.

FIG. 13 is a block diagram illustrating the configuration of a wireless communication device according to a fifth embodiment. The wireless communication device of FIG. 13 comprises an antenna device 30 as per any of the descriptions given with reference to FIGS. 1 to 12, a wireless communication circuit 31, and a signal processing circuit 32. In FIG. 13, the antenna device 30 is illustrated as a side view. The antenna device 30 may use one of the two antenna elements 2 and 3 as a transmission antenna element and may use the other as a reception antenna element. The wireless communication circuit 31 radiates a wireless signal obtained by modulating a baseband signal sent from the signal processing circuit 32, from the antenna device 30, and sends a baseband signal obtained by demodulating a wireless signal received by the antenna device 30, to the signal processing circuit 32.

Sixth Embodiment

Figure 14:
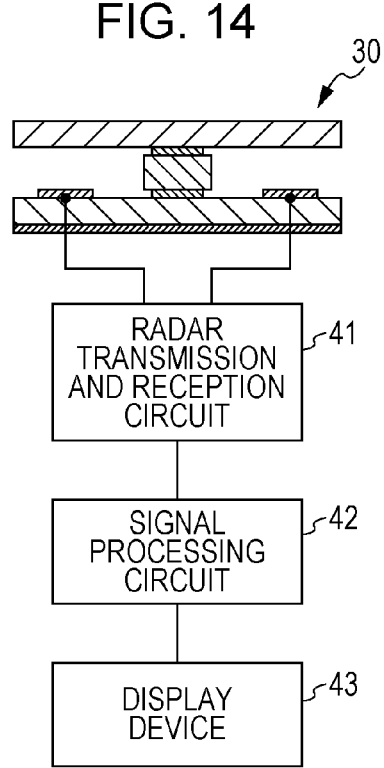
FIG. 14 is a block diagram illustrating the configuration of a radar device according to a sixth embodiment.

FIG. 14 is a block diagram illustrating the configuration of a radar device according to a sixth embodiment. The radar device of FIG. 14 comprises the antenna device 30 as per any of the descriptions given with reference to FIGS. 1 to 12, a radar transmission and reception circuit 41, a signal processing circuit 42, and a display device 43. In FIG. 14, the antenna device 30 is illustrated as a side view. As in the wireless communication device of FIG. 13, in the radar device of FIG. 14 also, the antenna device 30 may use one of the two antenna elements 2 and 3 as a transmission antenna element and may use the other as a reception antenna element. The radar transmission and reception circuit 41 radiates radar waves from the antenna device 30 under the control of the signal processing circuit 42, and receives radar waves reflected by a target and input to the antenna device 30. The signal processing circuit 42 determines the distance from the antenna device 30 to the target, speed, and the like on the basis of the propagation time, frequency changes, and the like of the radar waves, and displays the result thereof on the display device 43.

Hereinafter, simulation results for an antenna device according to a working example will be described with reference to FIGS. 15 to 17.

The following parameters were set and a simulation was carried out. The antenna device of FIG. 1 was configured as follows. The relative permittivity of the dielectric substrates 1 and 11 was 3.0, and the dielectric loss tangent was 0.0058. The relative permittivity of the radome 21 was 2.5. The antenna elements 2 and 3 were 0.91 mm×0.91 mm square patch antennas. The antenna elements 2 and 3 were arranged having a 13.2-mm distance (distance between centers) in the X direction. The EBG structure was arranged between the antenna elements 2 and 3. In the EBG structure, 13 patch conductors 4 were arranged in one column in the Y direction. The length of the sides of the patch conductors 4, 12, and 13 was w=0.65 mm, and the distance between patch conductance mutually adjacent in the XY plane was d=0.08 mm. The diameter of the via conductors 5 was 0.25 mm and the length was h1=0.254 mm. The diameter of the via conductors 14 was 0.25 mm and the length was h2=0.52 mm.

Figure 15:
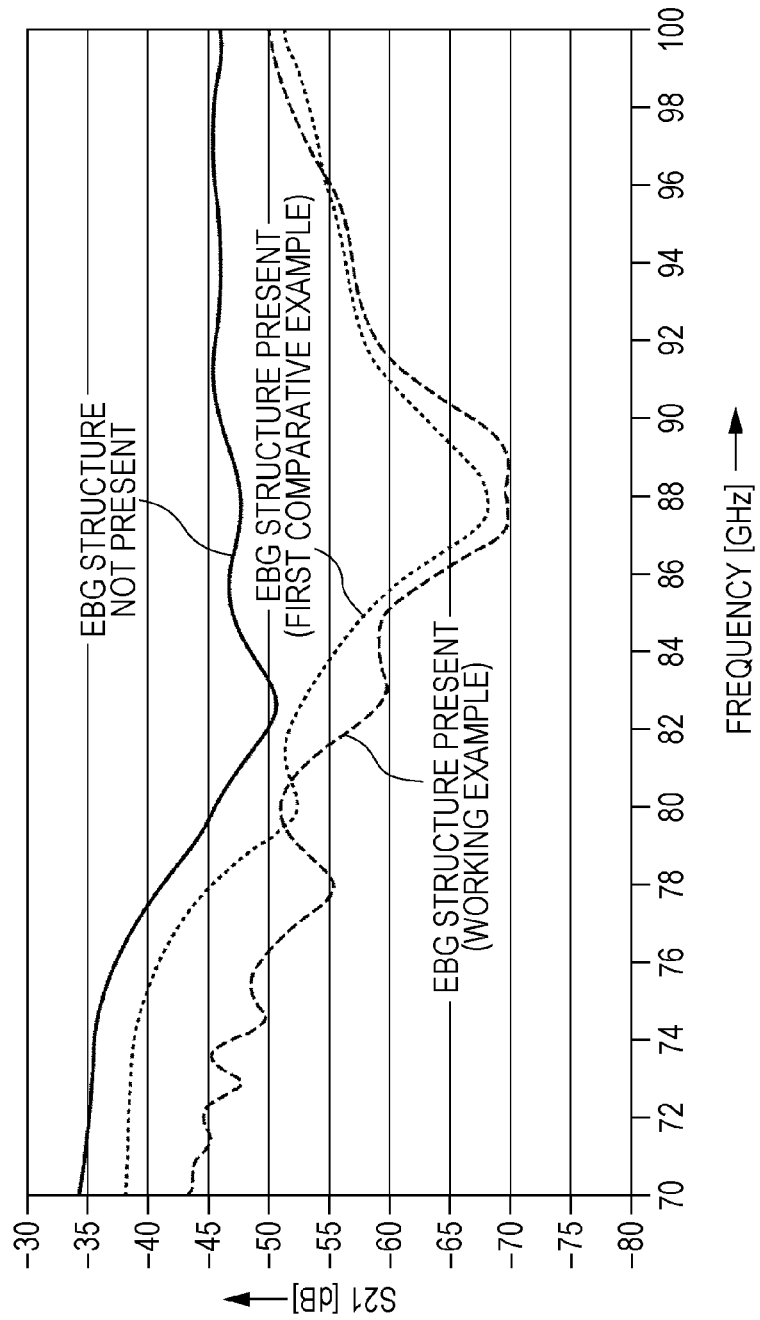
FIG. 15 is a graph of frequency characteristics of antenna devices according to a working example and a comparative example.

FIG. 15 is a graph of frequency characteristics of antenna devices according to a working example and a comparative example. FIG. 15 illustrates the case where an EBG structure that includes the patch conductors 12, the via conductors 14, the patch conductors 4 and 13, and the via conductors 5 is provided (working example), the case where an EBG structure that includes only the patch conductors 4 and the via conductors 5 is provided (first comparative example), and the case where an EBG structure is not provided. According to FIG. 15, it is apparent that a high isolation suppression effect is obtained by the antenna device of the working example.

Figure 16:
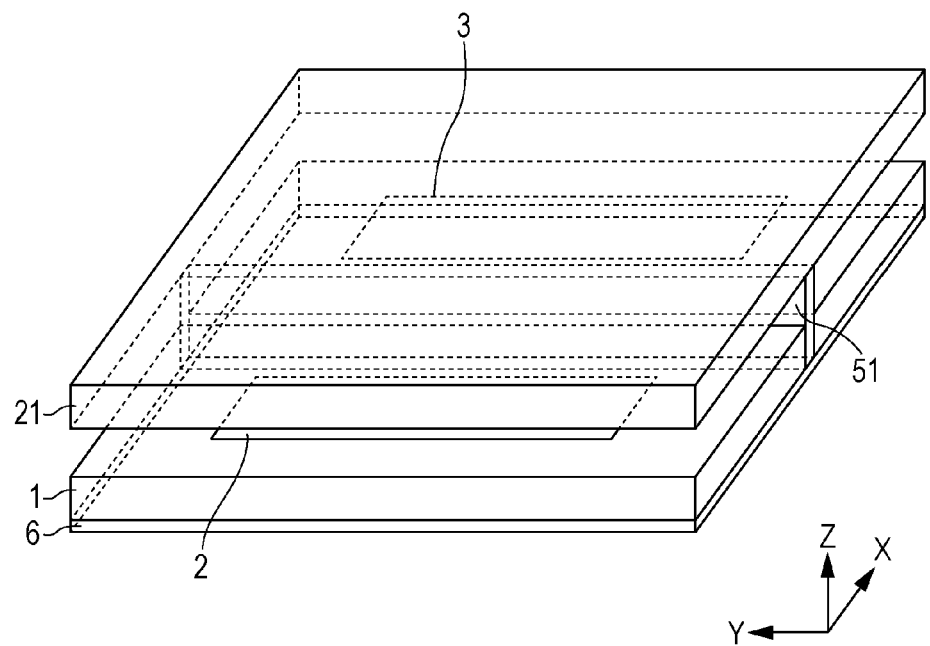
FIG. 16 is a perspective view illustrating the configuration of an antenna device according to a second comparative example.

FIG. 16 is a perspective view illustrating the configuration of an antenna device according to a second comparative example. The antenna device of FIG. 16 comprises a ground conductor 51 instead of the EBG structure of the antenna device of FIG. 1. The dimensions of the ground conductor 51 were 0.1 mm in the X direction, 11.8 mm in the Y direction, and 3.0 mm in the Z direction.

Figure 17:
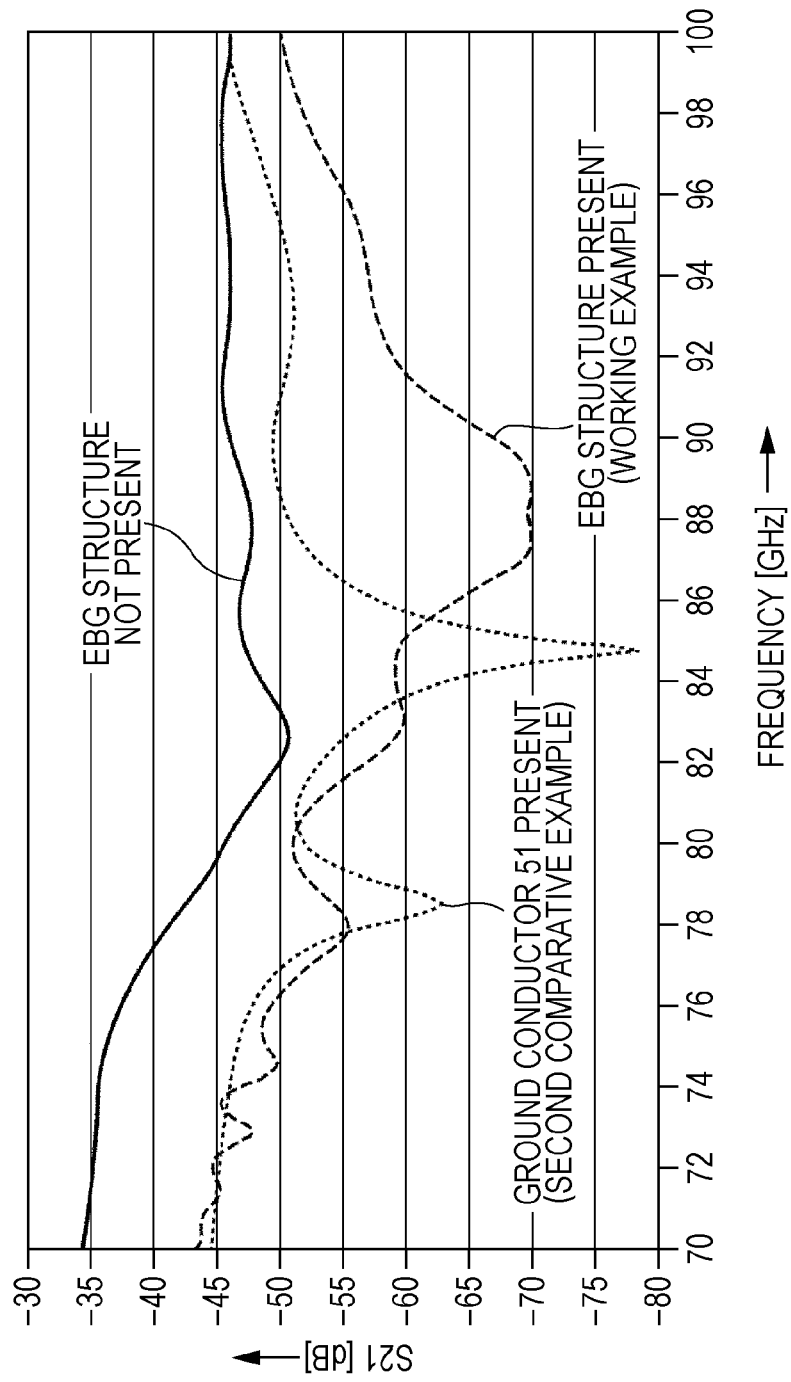
FIG. 17 is a graph of frequency characteristics of antenna devices according to a working example and a comparative example.

FIG. 17 is a graph of frequency characteristics of antenna devices according to a working example and a comparative example. According to FIG. 17, it is apparent that wide band characteristics are not able to be realized even when the ground conductor 51 is provided instead of the EBG structure. In addition, when the ground conductor 51 is provided instead of the EBG structure, it is difficult to set the antiresonance frequency of the ground conductor 51 to the desired frequency.

An antenna device, a wireless communication device, and a radar device according to an aspect of the present disclosure are provided with the following configurations.

An antenna device according to a first aspect of the present disclosure is provided with: a first dielectric substrate that has first and second surfaces; first and second antenna elements that are arranged on the first surface of the first dielectric substrate; a ground conductor that is arranged on the second surface of the first dielectric substrate; and an electromagnetic band gap (EBG) structure that is arranged between the first and second antenna elements, the EBG structure comprising:

a plurality of first patch conductors that are each arranged in contact with the first surface of the first dielectric substrate and are each electromagnetically coupled with the ground conductor; a plurality of second patch conductors that are each arranged in a prescribed distance from the first surface of the first dielectric substrate in a direction opposite to the second surface of the first dielectric substrate, and are each electromagnetically coupled with corresponding one of the plurality of first patch conductors; and a plurality of first connection conductors that electrically connect the plurality of first patch conductors with the plurality of second patch conductors.

An antenna device according to a second aspect of the present disclosure is constituted by, in the antenna device according to the first aspect, the EBG structure further comprising a second dielectric substrate that has first and second surfaces, at least part of the second surface of the second dielectric substrate including a contact region that makes contact with the first surface of the first dielectric substrate by way of the plurality of first patch conductors, the plurality of second patch conductors being arranged on the first surface of the second dielectric substrate, and the plurality of first connection conductors being a plurality of via conductors that each pass through the second dielectric substrate.

An antenna device according to a third aspect of the present disclosure is constituted by, in the antenna device according to the second aspect, the antenna device further comprising a radome that has first and second surfaces, and the second surface of the radome making contact with the first surface of the second dielectric substrate.

An antenna device according to a fourth aspect of the present disclosure is constituted by, in the antenna device according to the second aspect, the second dielectric substrate being a radome.

An antenna device according to a fifth aspect of the present disclosure is constituted by, in the antenna device according to the first aspect, the antenna device further comprising a radome that has first and second surfaces, the radome being arranged in the prescribed distance from the first surface of the first dielectric substrate in the direction opposite to the second surface of the first dielectric substrate, the second surface of the radome opposing the first surface of the first dielectric substrate with the prescribed distance therebetween, the plurality of second patch conductors being arranged on the second surface of the radome, and the EBG structure further comprising a connector component that comprises a plurality of sockets that accommodate each of the plurality of first connection conductors.

An antenna device according to a sixth aspect of the present disclosure is constituted by, in the antenna device according to one of the first to fifth aspects, the antenna device further comprising a plurality of second connection conductors that are a plurality of via conductors that each pass through the first dielectric substrate, and electrically connect the plurality of first patch conductors with the ground conductor.

A wireless communication device according to a seventh aspect of the present disclosure comprises: an antenna device according to one of the first to sixth aspects; and a wireless communication circuit that uses the antenna device to transmit and receive wireless signals.

A radar device according to an eighth aspect of the present disclosure comprises: an antenna device according to one of the first to sixth aspects; and a radar transmission and reception circuit that uses the antenna device to transmit and receive radar waves.

What is claimed is:

1. An antenna device comprising:
    a first dielectric substrate that has first and second surfaces;
    first and second antenna elements that are arranged on the first surface of the first dielectric substrate;
    a ground conductor that is arranged on the second surface of the first dielectric substrate; and
    an electromagnetic band gap structure that is arranged between the first and second antenna elements,
    the electromagnetic band gap structure comprising:
    a plurality of first patch conductors that are each arranged in contact with the first surface of the first dielectric substrate and are each electromagnetically coupled with the ground conductor;
    a plurality of second patch conductors that are each arranged in a prescribed distance from the first surface of the first dielectric substrate in a direction opposite to the second surface of the first dielectric substrate, and are each electromagnetically coupled with corresponding one of the plurality of first patch conductors; and
    a plurality of first connection conductors that electrically connect the plurality of first patch conductors with the plurality of second patch conductors,
    wherein the electromagnetic band gap structure further comprises a second dielectric substrate that has first and second surfaces,
    at least part of the second surface of the second dielectric substrate includes a contact region that makes contact with the first surface of the first dielectric substrate by way of the plurality of first patch conductors,
    the plurality of second patch conductors are arranged on the first surface of the second dielectric substrate, and
    the plurality of first connection conductors are a plurality of via conductors that each pass through the second dielectric substrate.

2. The antenna device according to claim 1, further comprising:
    a radome that has first and second surfaces, the second surface of the radome making contact with the first surface of the second dielectric substrate.

3. The antenna device according to claim 1, wherein the second dielectric substrate is a radome.

4. The antenna device according to claim 1, further comprising:
    a plurality of second connection conductors that are a plurality of via conductors that each pass through the first dielectric substrate, and electrically connect the plurality of first patch conductors with the ground conductor.

5. A wireless communication device comprising:
    the antenna device according to claim 1; and
    a wireless communication circuit that uses the antenna device to transmit and receive wireless signals.

6. A radar device comprising:
    the antenna device according to claim 1; and
    a radar transmission and reception circuit that uses the antenna device to transmit and receive radar waves.

7. An antenna device comprising:
    a first dielectric substrate that has first and second surfaces;

first and second antenna elements that are arranged on the first surface of the first dielectric substrate;

a ground conductor that is arranged on the second surface of the first dielectric substrate; and an electromagnetic band gap structure that is arranged between the first and second antenna elements, the electromagnetic band gap structure comprising:

a plurality of first patch conductors that are each arranged in contact with the first surface of the first dielectric substrate and are each electromagnetically coupled with the ground conductor;

a plurality of second patch conductors that are each arranged in a prescribed distance from the first surface of the first dielectric substrate in a direction opposite to the second surface of the first dielectric substrate, and are each electromagnetically coupled with corresponding one of the plurality of first patch conductors; and a plurality of first connection conductors that electrically connect the plurality of first patch conductors with the plurality of second patch conductors, wherein the antenna device further comprises a radome that has first and second surfaces, the radome being arranged in the prescribed distance from the first surface of the first dielectric substrate in the direction opposite to the second surface of the first dielectric substrate, and the second surface of the radome opposing the first surface of the first dielectric substrate with the prescribed distance therebetween, wherein the plurality of second patch conductors is arranged on the second surface of the radome, and the electromagnetic band gap structure further comprises a connector component that comprises a plurality of sockets that accommodate each of the plurality of first connection conductors.

8. A wireless communication device comprising:

the antenna device according to claim 7; and a wireless communication circuit that uses the antenna device to transmit and receive wireless signals.

9. A radar device comprising:

the antenna device according to claim 7; and a radar transmission and reception circuit that uses the antenna device to transmit and receive radar waves.

\* \* \* \* \*